United States Patent
Edwards et al.

(10) Patent No.: US 11,238,154 B2
(45) Date of Patent: Feb. 1, 2022

(54) MULTI-LATERAL PROCESS TREES FOR MALWARE REMEDIATION

(71) Applicant: McAfee, LLC, San Jose, CA (US)

(72) Inventors: Jonathan L. Edwards, Portland, OR (US); Saurabh Gautam, Cork (IE); Dhananjay Kumar, Cork (IE); Joel R. Spurlock, Portland, OR (US)

(73) Assignee: McAfee, LLC, San Jose, CA (US)

( * ) Notice: Subject to any disclaimer, the term of this patent is extended or adjusted under 35 U.S.C. 154(b) by 220 days.

(21) Appl. No.: 16/503,859

(22) Filed: Jul. 5, 2019

(65) Prior Publication Data
US 2021/0004458 A1    Jan. 7, 2021

(51) Int. Cl.
G06F 21/55 (2013.01)
G06F 21/56 (2013.01)

(52) U.S. Cl.
CPC .......... G06F 21/554 (2013.01); G06F 21/568 (2013.01); G06F 2221/034 (2013.01)

(58) Field of Classification Search
None
See application file for complete search history.

(56) References Cited

U.S. PATENT DOCUMENTS

| | | | |
|---|---|---|---|
| 7,472,420 B1 | 12/2008 | Pavlyushchik | |
| 8,352,409 B1 * | 1/2013 | Satish | G06N 20/00 706/52 |
| 8,370,931 B1 * | 2/2013 | Chien | G06F 21/566 726/22 |
| 8,528,087 B2 | 9/2013 | Hsu et al. | |
| 8,578,345 B1 * | 11/2013 | Kennedy | G06F 21/57 717/132 |
| 9,049,222 B1 * | 6/2015 | He | H04L 63/1425 |
| 9,298,921 B2 | 3/2016 | Tsviatkou et al. | |
| 10,867,039 B2 * | 12/2020 | Gordeychik | G06F 21/552 |
| 2007/0067844 A1 * | 3/2007 | Williamson | G06F 21/566 726/24 |
| 2011/0083180 A1 | 4/2011 | Mashevsky et al. | |
| 2012/0124007 A1 * | 5/2012 | Sten | G06F 11/1448 707/685 |
| 2015/0058988 A1 * | 2/2015 | Katz | H04L 63/1416 726/23 |
| 2015/0101049 A1 * | 4/2015 | Lukacs | G06F 21/566 726/23 |
| 2015/0261958 A1 * | 9/2015 | Hale | G06F 21/00 726/25 |

(Continued)

OTHER PUBLICATIONS

Kazanciyan et al, Investigating PowerShell Attacks, 2014, MANDIANT, 23 Pages (Year: 2014).*

(Continued)

*Primary Examiner* — Christopher C Harris
(74) *Attorney, Agent, or Firm* — Patent Capital Group

(57) ABSTRACT

There is disclosed in one example a computing apparatus, including: a processor and a memory; and instructions encoded within the memory to instruct the processor to provide a security agent to: identify a malicious process; construct a genealogical process tree of the malicious process, the genealogical process tree including both vertical direct inheritance and horizontal indirect inheritance relationships; and terminate the malicious process and at least some related processes in the genealogical process tree.

20 Claims, 9 Drawing Sheets

(56) References Cited

U.S. PATENT DOCUMENTS

| | | | |
|---|---|---|---|
| 2015/0332045 A1* | 11/2015 | Akiyama | G06F 21/14 |
| | | | 726/23 |
| 2017/0024561 A1 | 1/2017 | Hajmasan et al. | |
| 2017/0171224 A1* | 6/2017 | Pal | G06F 9/4484 |
| 2017/0171229 A1* | 6/2017 | Arzi | H04L 63/1408 |
| 2017/0171240 A1* | 6/2017 | Arzi | G06F 21/566 |
| 2017/0223040 A1* | 8/2017 | Ikuse | H04L 63/1425 |
| 2017/0286690 A1* | 10/2017 | Chari | G06F 21/577 |
| 2017/0300690 A1* | 10/2017 | Ladnai | G06F 21/554 |
| 2018/0048667 A1* | 2/2018 | Tang | G06F 21/554 |
| 2018/0227320 A1* | 8/2018 | Ladnai | H04L 63/1433 |
| 2019/0294788 A1* | 9/2019 | Chang | G06F 21/554 |
| 2020/0201989 A1* | 6/2020 | Shu | G06F 16/9024 |
| 2020/0302058 A1* | 9/2020 | Kenyon | G06F 21/52 |
| 2020/0344248 A1* | 10/2020 | De Jesus | G06F 21/552 |

OTHER PUBLICATIONS

International Search Report and Written Opinion in International Patent Application No. PCT/US2020/040840 dated Oct. 13, 2020, 18 pages.

\* cited by examiner

MULTI-LATERAL PROCESS TREES FOR MALWARE REMEDIATION

FIELD OF THE SPECIFICATION

This application relates in general to computer security, and more particularly though not exclusively, to a system and method for providing multi-lateral process trees for malware remediation.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
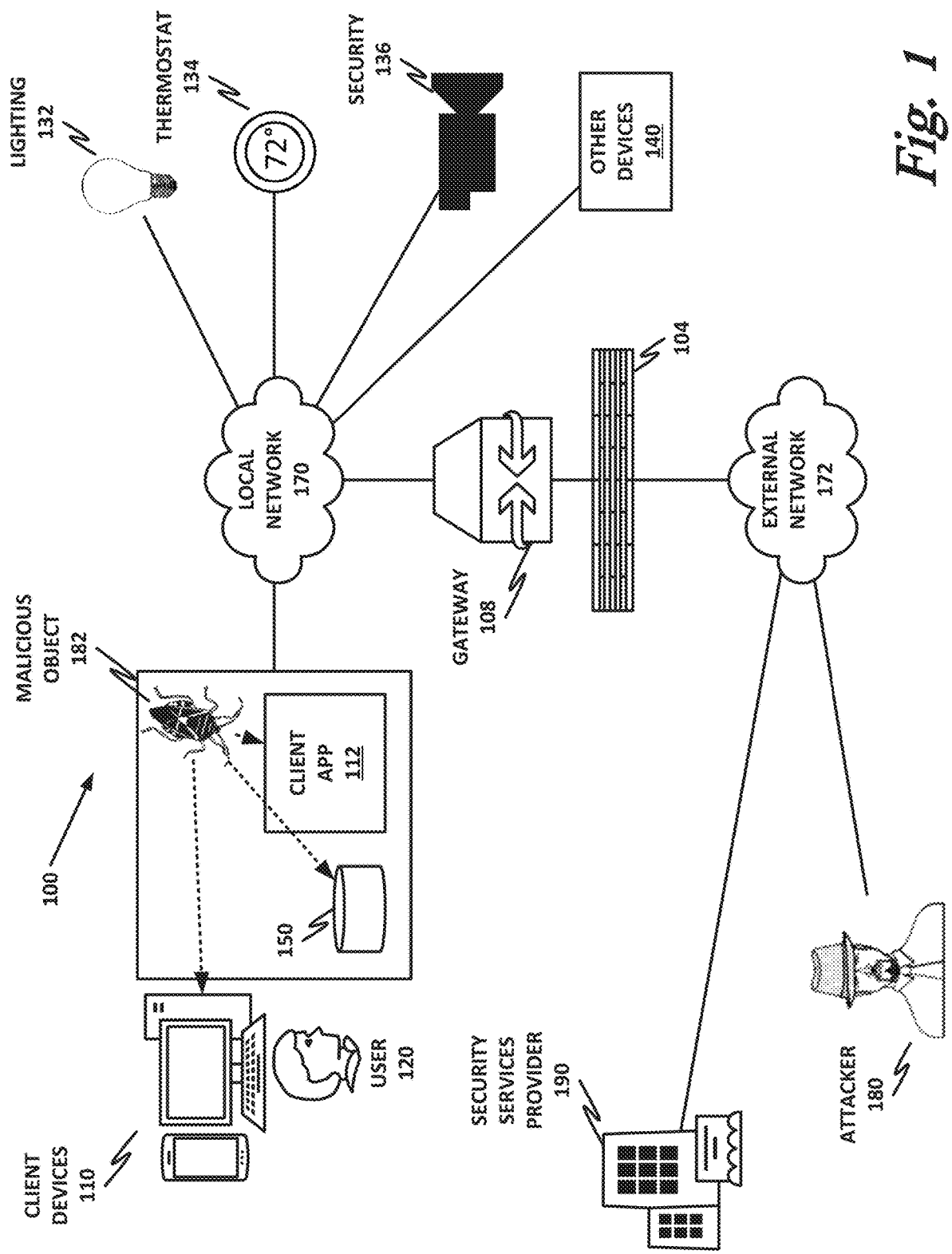
FIG. 1 is a block diagram illustrating selected elements of a security ecosystem.

In an example, there is disclosed a computing apparatus, comprising: a processor and a memory; and instructions encoded within the memory to instruct the processor to provide a security agent to: identify a malicious process; construct a genealogical process tree of the malicious process, the genealogical process tree including both vertical direct inheritance and horizontal indirect inheritance relationships; and terminate the malicious process and at least some related processes in the genealogical process tree.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Remediation of computer security exploits in the modern environment is more complicated than it was in the days of more basic attacks. First generation computer security software relied on hashes of individual files to identify known malware objects.

Because security engines on both the client side and on server devices have become very effective at identifying and defeating this kind of threat, attackers have developed more sophisticated threats. Instead of a single executable that a user is tricked into running on the machine, malware objects may be delivered via a number of different security vectors, including, by way of illustrative and nonlimiting example, email, web browsers, open ports, security apertures in software, security apertures in operating systems, local area networks (LANs), and removable devices. Instead of installing a single, monolithic executable object that can be readily identified, killed, and scrubbed from the system, more sophisticated malware may take more distributed action.

For example, some attackers have evolved toward fileless and living off the land attacks. These are attacks that do not install a persistent file, but rather use objects such as registry entries, scheduled processes, command lines, Windows management interface (WMI) objects, and similar to deliver a payload in a distributed manner.

These fileless and living off the land exploits may use more short-lived processes, and may piggyback on trusted executables to perform their work. For example, the task scheduler is a trusted executable. It is generally not considered practical to simply kill the task scheduler. In many cases, this would completely crash the operating system, or at least prevent it from doing anything useful.

In this type of environment, terminating one process and making sure that it does not automatically run again does not necessarily stop a threat.

To mitigate more distributed threats, the present specification describes a system and method for identifying not just malicious processes, but identifying and mitigating sources of persistence at various levels. These sources of persistence may have various relationships between processes and configurations. For example, as a simple matter of process inheritance, if a process (e.g., an executable file) is running and is determined to be malicious, then in at least some embodiments, all child processes of that malicious process may be terminated. In this specification, looking for child processes may be referred to as a vertical downward search. Stated otherwise, in the FIGURES, a vertical line downward indicates a child process relationship.

However, there are also vertical, "upward" relationships. For example, if a process is identified as being malicious, it may not be sufficient to look vertically downward and kill all child processes. Rather, it may also be necessary to look vertically upward and terminate the parent processes. However, unlike the vertical downward operation, the vertical upward operation cannot simply terminate every parent process. If this model were followed, then ultimately this would lead to terminating the operating system kernel itself.

Although this will result in good theoretical security, it will also result in the computer being useless.

In addition to vertical relationships, there may be indirect parental relationships. These are represented in a process graph as horizontal relationships. Horizontal relationships are created via "nonlinear" relationships. For example, if process A spawns process B, this is a direct, vertical parent-child relationship. But to prevent process B from being identified as malicious when process A is malicious, process A may instead use a nonlinear relationship to spawn process B. For example, process A may rely on certain "autostart" features of modern operating systems to indirectly spawn process B. In one illustrative example, process A creates a WMI action trigger that spawns process B. In this case, process B will be a direct vertical child—not of process A, but rather of WmiPRvSe.exe. Process A creates this vertical relationship by using a "nonlinear" relationship to manipulate the WMI database. Thus, there is a nonlinear relationship between process A and the WMI database, and this non-linear relationship is then used to create a horizontal, or indirect, parent-child relationship between process A and process B.

This can provide two benefits to the malware author. If process A is identified as malicious, then process B is not automatically terminated as a direct child of the malicious process. Furthermore, if process B is identified as malicious, process A is not identified as its direct, linear (e.g., vertical) parent. This helps to insulate process A from the identification of process B. A successful identification of process A as a parent of process B requires, instead, examining the nonlinear relationship between process A and the WMI database.

Consider an illustrative example in which a corrupt document exploits a vulnerability in a document viewing application. Shell code from the document runs and spawns a PowerShell instance to do more complicated work. In this illustration, the script schedules a task to run periodically. The scheduled script then persists a third script into a WMI action trigger. When the third script runs its actions are detected behaviorally, for example, by a security agent or other malware process running on the machine.

In this illustration, because there are no specific malicious files to identify, much more information may be needed to remove the malware, or at least to get an idea of where it came from. Simply terminating the third script that was identified as malicious will not effectively mitigate the issue. Furthermore, going vertically up the genealogy of this third script simply leads to the WMI process. As long as WMI itself has not been compromised, it is not a malicious actor, per se. Rather, it is an innocent victim of the attack, and its capabilities have been exploited in a malicious way.

In this illustration, two sources of persistency may be identified, namely the scheduled task and the WMI trigger. Ideally, both of these should be removed. Any persistence involving PowerShell, reader.exe, svchost.exe, the email client, and similar should not be removed. In other words, a properly functioning security agent should not remove the user's email client simply because the email client was used to read a malicious email.

In one example, the security agent may examine the command line of the PowerShell command to identify "ShippingInvoice.doc" as the source of the malware. If it is not feasible to examine the command line to identify ShippingInvoice.doc as the source of the malware, then a report of the activity should at least include the command line. It may also include the email client to identify that the source of the infected document may have been an email. The system may be configured to identify a particular vertical boundary above which it is not helpful to go. For example, explorer.exe is a parent of almost every task in a Windows operating system. Identifying explorer.exe in the vertical genealogy of a malicious process is not helpful for many security contexts.

It should be noted that some processes have two or more parents. For example, the first parent is a parent/child relationship formed when the process creates another process. In the FIGURES of this specification, such a relationship is represented by a solid vertical line. A second species of parentage is a relationship formed when a process communicates with another, causing it to create a process. This communication is represented in the present specification by a nonlinear dotted line, and the indirect parent-child relationship is represented by a horizontal dashed line.

Because of this complicated genealogy, there may not be a clear chain of execution for a process. Working down to up and right to left on a graph, there may be multiple points where a decision needs to be made of what is the "malicious" parent that provides the malicious persistency.

In at least some embodiments, all individual files may be represented as clean. It is, instead, processes and configurations that receive a reputation. Processes may be marked as uninvolved, innocent victims, or malicious.

It should also be noted that when working through a graph horizontally and vertically, there may not be a clear stopping point. For example, if the document reader "reader.exe" was simply performing its function of reading a document, it may be an innocent victim. But even if this is a standard operating system file, if it has been compromised, then it may be malicious itself.

According to embodiments of the present specification, at runtime a graph of process relationships may be built and maintained. This graph can include vertical, horizontal, and nonlinear relationships (e.g., nonlinear relationships may be used to create horizontal relationships). When a detection occurs, the graph may be consulted and the remediation may proceed down the graph to malicious children, across the graph to malicious "siblings," and up the graph to malicious and eventually to nonmalicious parents.

This treats remediation as selecting a subset of a graph. Using this system, indirect parents may be identified, which may be more informative than simply examining direct parentage. In some embodiments, a "root" process is identified, beyond which there can be no more maliciousness. Some embodiments also include a module to trim the graph so that useful information is retained, but the size remains small.

During normal system operation, a security agent of the present specification collects child-parent relationships, as well as any indirect relationships that it is able to find. Some indirect relationships can only be deduced with hooking, or other high cost techniques. Thus, in some embodiments, indirect relationships are collected only for "high risk" or "suspicious" processes that have extra monitoring applied to them. These high-risk processes may be identified using common antivirus or anti-malware techniques.

During runtime, a graph of process relationships may be built. Once the graph is built, or as the graph is being built, the concept of an "interesting" process is used to trim the graph. Branches of the graph consisting only of terminated, uninteresting processes may be removed. This trimming can occur periodically, when a process ends, as the graph is built, or at any combination of the foregoing.

If detection occurs on a file, then affected processes may be found in the graph. If detection occurs on a process, then the process may be found in the graph.

Once initial processes have been found in the graph, remediation may occur on all related processes. This can help to identify sources of persistency, and to remediate those sources.

Advantageously, some embodiments of the present specification include scanners that can identify a process as suspicious. When a process is identified as suspicious, that suspicion may be propagated to all children of the process.

The identification of horizontal parent-child relationships for a process graph via nonlinear relationships may require examining a number of autostart mechanisms within the operating system. The specific autostart mechanisms will depend on the specific operating system, and the version of that operating system. For example, Windows XP™ and Windows 10™, although they are both Windows operating systems, may have very different autostart mechanisms. Similarly, Red Hat™ Enterprise Linux and Debian™ Linux may have very different initialization scripts, and are very different from Microsoft™ Windows or Apple OS X™.

By way of illustrative and nonlimiting example, a Windows operating system may include the following autostart mechanisms. By manipulating these autostart mechanisms, a process may create horizontal parent-child relationships.

Examples of autostart locations may include:

Autostart locations in the registry. These locations can be used by malware to autostart themselves on the next logon. This is a common persistence technique used by malware, and the parent in this case will be an innocent process and not the malicious process that created the registry entry. Thus, the true parentage may be tracked by an indirect relation between the malicious process and the process started from the autostart entry.

StartupFolders. Any application added to this folder is executed by the innocent explorer.exe logon.

Code Injection. Malicious processes may inject code into an innocent process.

Scheduled Tasks. These can be scheduled, for example, via a WMI event or the task scheduler.

Services. Windows services are launched by the innocent service control manager on behalf of a malicious process.

ForceParent. This is a method in which a process may CreateProcessAsUser. This is a Windows API that may be used to launch a process and make some other unrelated process its parent. This can be used by malware to make an unrelated innocent process the parent, even when the purported parent did not actually launch the malware process.

Embodiments of the security agent described herein monitor these mechanisms to create horizontal or indirect parent-child relationships in a process tree. Note that in some cases, monitoring these processes (e.g., via hooks) is expensive in terms of memory and/or compute resources. Thus, in at least some embodiments, hooks are inserted only for processes that have been identified as suspicious. For example, if an executable is unknown, if it was loaded from a removable drive or a network share, downloaded from the internet, or has been scanned and found to have potential malware attributes, that process may be particularly monitored to look for horizontal relationships.

A system and method for providing multi-lateral process trees for malware remediation will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram illustrating selected elements of a security ecosystem 100. Security ecosystem 100 may be configured or adapted to provide multi-lateral process trees for malware remediation, according to embodiments of the present specification.

In the example of FIG. 1, security ecosystem 100 may be an enterprise, a government entity, a data center, a telecommunications provider, a "smart home" with computers, smart phones, and various Internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the Internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the Internet. Local network 170 may also provide access to an external network, such as the Internet, via external network 172. External network 172 may similarly be any suitable type of network.

Local network 170 may connect to the Internet via gateway 108, which may be responsible, among other things, for providing a logical boundary between home network 172 and external network 170. Local network 170 may also provide services such as dynamic host configuration protocol (DHCP), gateway services, router services, and switching services, and may act as a security portal across local boundary 104.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
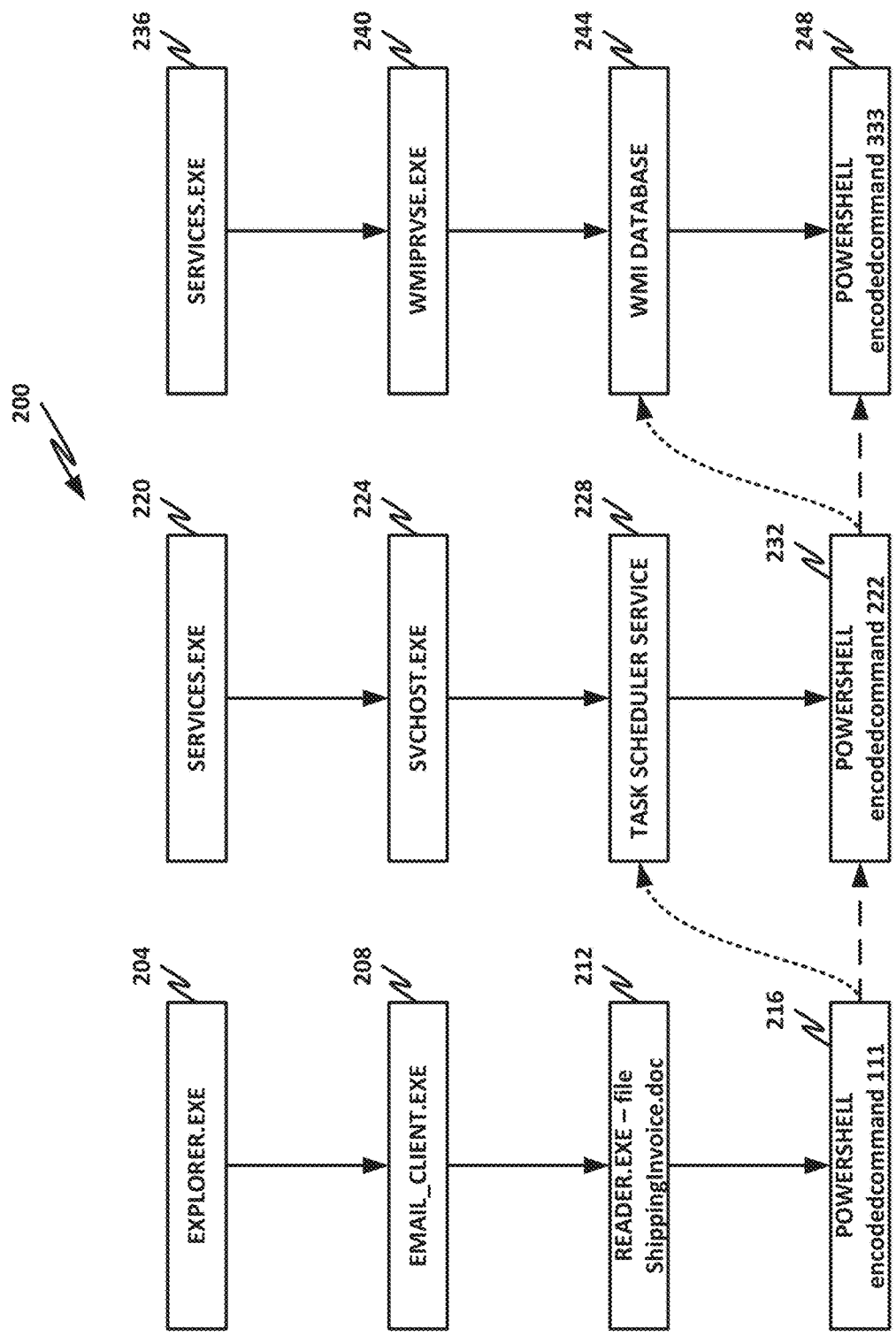
FIG. 2 is a block diagram of a process tree that may be built to help track malicious or possibly malicious activity.

FIG. 2 is a block diagram of a process tree 200. Process tree 200 may be built to help track malicious or possibly malicious activity by an application.

In this illustrative example, Windows applications are used, although this should be understood as a nonlimiting example.

In this example, explorer.exe 204 launches email_client.exe 208. This is a direct parent-child relationship represented by a solid vertical line. Email_client.exe has a reader plug-in that allows a user to read Word documents. Thus, email_client.exe 208 launches reader.exe 212, which reads a static file ShippingInvoice.doc. ShippingInvoice.doc may or may not be malware, but in this example includes active code. ShippingInvoice.doc 212 launches an instance of PowerShell 216. PowerShell 216 launches encodedcommand 111.

From explorer.exe 204 to PowerShell 216, there is a clear descendancy of solid vertical lines following the path 204→208→212→216. However, the descendancy tree does not end here.

Separately, services.exe 220 launches svchost.exe 224. svchost.exe 224 is an innocent and ordinary system process that provides for acknowledged system functionality. Svchost.exe 224 launches a task scheduler service 228 at startup. The chain from 220→224→228 is an ordinary genealogy for task scheduler service 228. However, there is a nonlinear relationship represented by a nonlinear dotted arrow between 216 and 228. This represents that PowerShell 216 executing encodedcommand 111 manipulates the database for task scheduler service 228. This causes task scheduler service 228 to launch another instance of PowerShell 232. This instance executes encodedcommand 222.

Again separately, services.exe 236 launches an instance of WmiPRvSe.exe 240. The WmiPRvSe.exe 240 launch accesses WMI database 244. In this case, PowerShell 222 has a nonlinear relationship with WMI database 244. For example, PowerShell 232 has inserted a WMI action trigger into WMI database 244. This causes WmiPRvSe.exe 240 to launch PowerShell 248 with encodedcommand 333.

Because PowerShell 216 created PowerShell 232 via a non-linear transaction with task scheduler service 228, a horizontal dashed line between PowerShell 216 and PowerShell 232 represents an indirect parent-child relationship between the two. Similarly, because PowerShell 232 indirectly created PowerShell 248 via a nonlinear interaction with WmiPRvSe.exe 240, a dashed horizontal line between PowerShell 232 and PowerShell 248 represents an indirect parent-child relationship.

Although this tree may not necessarily represent malicious activity, it could. For example, ShippingInvoice.doc could be a corrupt document that exploits a vulnerability in reader.exe. Shell code within ShippingInvoice.doc runs and spawns a PowerShell instance to do more complicated work (PowerShell 216). This script, PowerShell 216, schedules a task to run periodically. This creates PowerShell 232. PowerShell 232 schedules a persistent third script into WMI database 244 as a WMI action trigger. When this third script (PowerShell 248) runs, its actions may be detected behaviorally. Because there are no specific malicious files within PowerShell 248, more information may be needed to remove the malware and to get an idea of where it came from. A security agent of the present specification can trace back the horizontal relationship between PowerShell 248, PowerShell 232, and PowerShell 216. It may then traverse vertically from PowerShell 216 to reader.exe, and identify that the original source of the malicious activity was ShippingInvoice.doc. However, WMI database 244 and task scheduler service 228 may both be identified as sources of persistency. The entries in these sources of persistency may need to be scrubbed to prevent PowerShell 232 and PowerShell 248 from launching, again. Furthermore, ShippingInvoice.doc 212 should be scrubbed or quarantined. And, naturally, PowerShell 216, PowerShell 232, and PowerShell 248 may be terminated, along with any direct vertical descendants of these processes.

WmiPRvSe.exe 240, task scheduler service 228, and reader.exe 212 may be identified in this instance as innocent victims of the malicious activity. Although they played a role in the malicious activity, they are not themselves necessarily compromised. Rather, they were simply performing their programmed functions. However, it may be desirable to patch security holes that made the attack possible.

Other processes may be identified as uninvolved. This does not mean that they have absolutely no connection to the malicious activity, but that their connection to the malicious activity is at least attenuated enough that they should not reasonably be considered to be involved in the activity. For example, from a security perspective, it is not very "interesting" that PowerShell 248 is ultimately a descendent of explorer.exe 204. The same can be said of virtually all user space processes.

Figure 3:
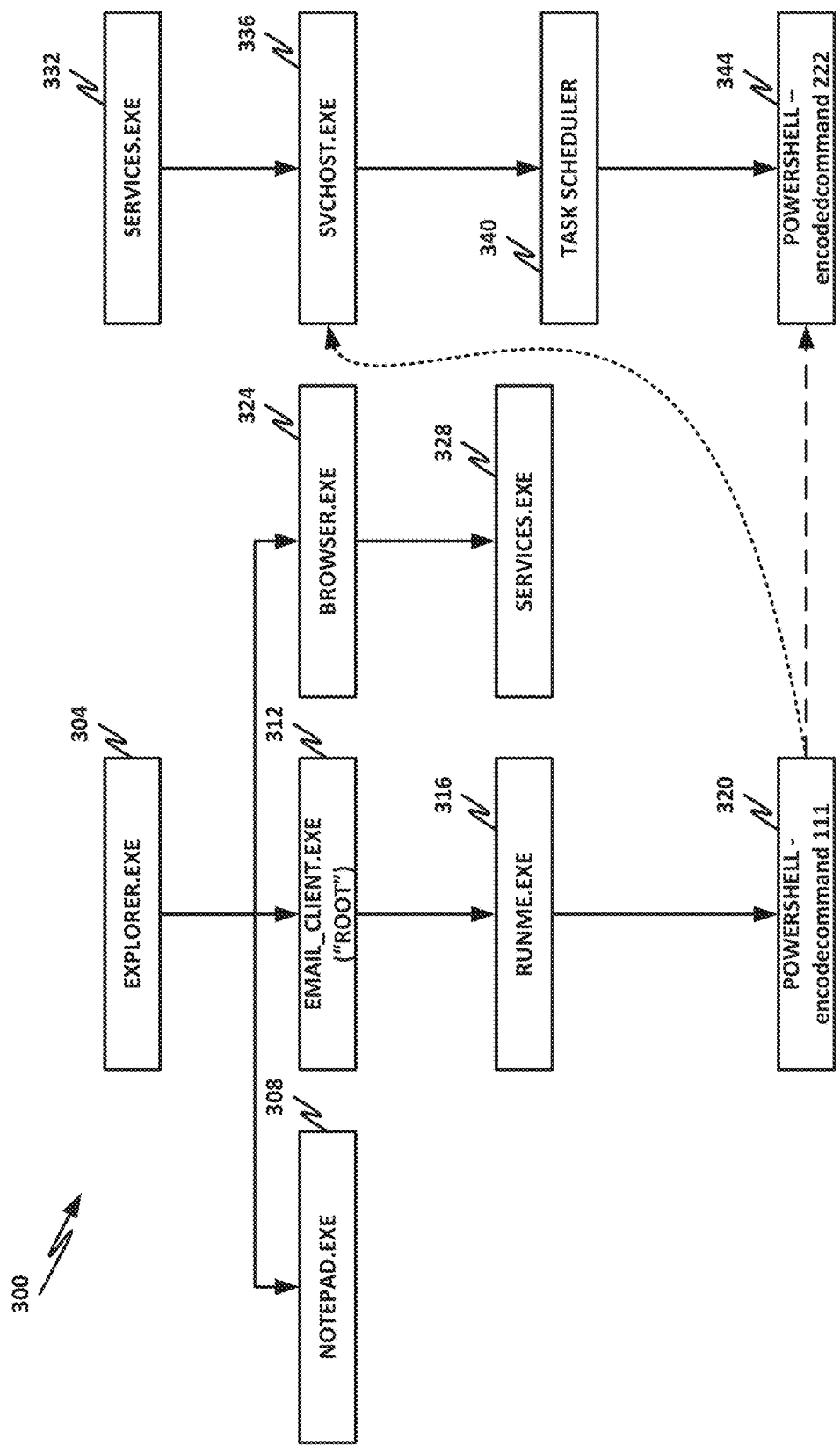
FIG. 3 is a block diagram of a process tree for use in the context of malware detection.

FIG. 3 is a block diagram of a process tree 300. Process tree 300 is disclosed particularly in the context of malware detection. In this example, runme.exe 316 has been identified (either as a file or as a process) as suspicious. Thus, a flag is set for runme.exe 316, as well as for its direct children, including PowerShell 320, and indirect descendants such as PowerShell 344.

In this example, explorer.exe 304 is a direct parent of three processes, namely notepad.exe 308, email_client.exe 312, and browser.exe 324. As discussed above, the fact that explorer.exe 304 is in this tree is not especially interesting from a security standpoint.

Browser.exe 324 is a direct parent of services.exe 328. However, services.exe 328 does not appear to have any connection to any malicious activity. Thus, browser.exe 324 and services.exe 328 may be identified as processes uninvolved with runme.exe 316. Similarly, notepad.exe 308 does not have any descendants, and does not appear to be involved in any malicious activity, and may also be marked as an uninvolved process. On the other hand, email_client.exe 312 is a direct parent of runme.exe 316. Runme.exe 316 is a direct parent of PowerShell 320, and PowerShell 320 has a nonlinear relationship with task scheduler service 340, in which PowerShell 320 has scheduled a task via task scheduler service 340.

Services.exe 332 is a direct parent to svchost.exe 336 and task scheduler 340. These are all known operating system processes, and may not be malicious in themselves. However, task scheduler 340 is a direct parent of PowerShell 344, which may be identified as malicious. PowerShell 344 has an indirect (horizontal) parent-child relationship with PowerShell 320, because PowerShell 320 caused PowerShell 344 to be spawned by task scheduler service 340.

Any one of runme.exe 316, PowerShell 320, or PowerShell 344 may be the one initially identified as a malicious process. If PowerShell 344 is the first identified, then the security agent may walk tree 300 to determine that there is an indirect parent-child relationship between PowerShell 344 and PowerShell 320. The security agent may also determine that PowerShell 320 is a direct descendent of runme.exe 316.

This may start a deep remediation of runme.exe, which ultimately will encompass all three of runme.exe 316, PowerShell 320, and PowerShell 344.

Whichever process is first identified, or however it is identified, the security agent may examine the graph beyond the point of detection. When identifying a set of processes to remediate, the security agent may start at the detected process and follow the tree downwards, following all direct and indirect links out of a process. In at least some examples, all direct children of the identified malicious process are automatically terminated, and all indirect children may also be terminated. By indirect children, it should be understood to be those that have a horizontal relationship in the graph. Nonlinear relationships (such as the relationship between PowerShell 320 and task scheduler service 340) do not necessarily imply the need for a termination. Task scheduler service 340 in this case may be considered an innocent victim of PowerShell 320, and is not malicious in itself. However, because PowerShell 320 caused PowerShell 344 to be spawned, this is an indirect parent-child relationship (horizontal) and therefore should be terminated.

Process tree 300 may also be followed in an upward direction, following both direct and indirect links. More judgment may be required in following indirect links upward. For example, PowerShell 344 spawned from task scheduler service 340, but task scheduler service 340 may be whitelisted as a system service that should not be terminated. A whitelist is used here to illustrate that task scheduler service 340 is a well-known service that can easily be whitelisted, but whitelisting should not be understood to be the only method for finding the appropriate termination boundary for traversing a graph upward.

In this case, PowerShell 320 is a direct descendent of runme.exe 316, and runme.exe 316 is not trusted. Furthermore, analysis may have indicated that runme.exe 316 is actually malicious.

Email_client.exe 312 may not necessarily be included on a whitelist of system services that should never be terminated, but may have a sufficiently high reputation to draw a security boundary between runme.exe 316 and email_client.exe 312. When following the graph upward, the stopping point is a process that is determined to not be under the control of the suspected process. This may be identified as the "root" process, and requires knowledge of how the operating system works. For example, some of the rules for Microsoft™ Windows include:

The parent process of all services is services.exe (running as system).

The parent process of all of a user's processes is "winlogon.exe."

The shell (normally explorer.exe) is a child of winlogon.exe, and is a parent to all or most processes launched by the user.

Other rules may be used to determine a root process for a Microsoft™ Windows operating system, or other operating systems.

Figure 4:
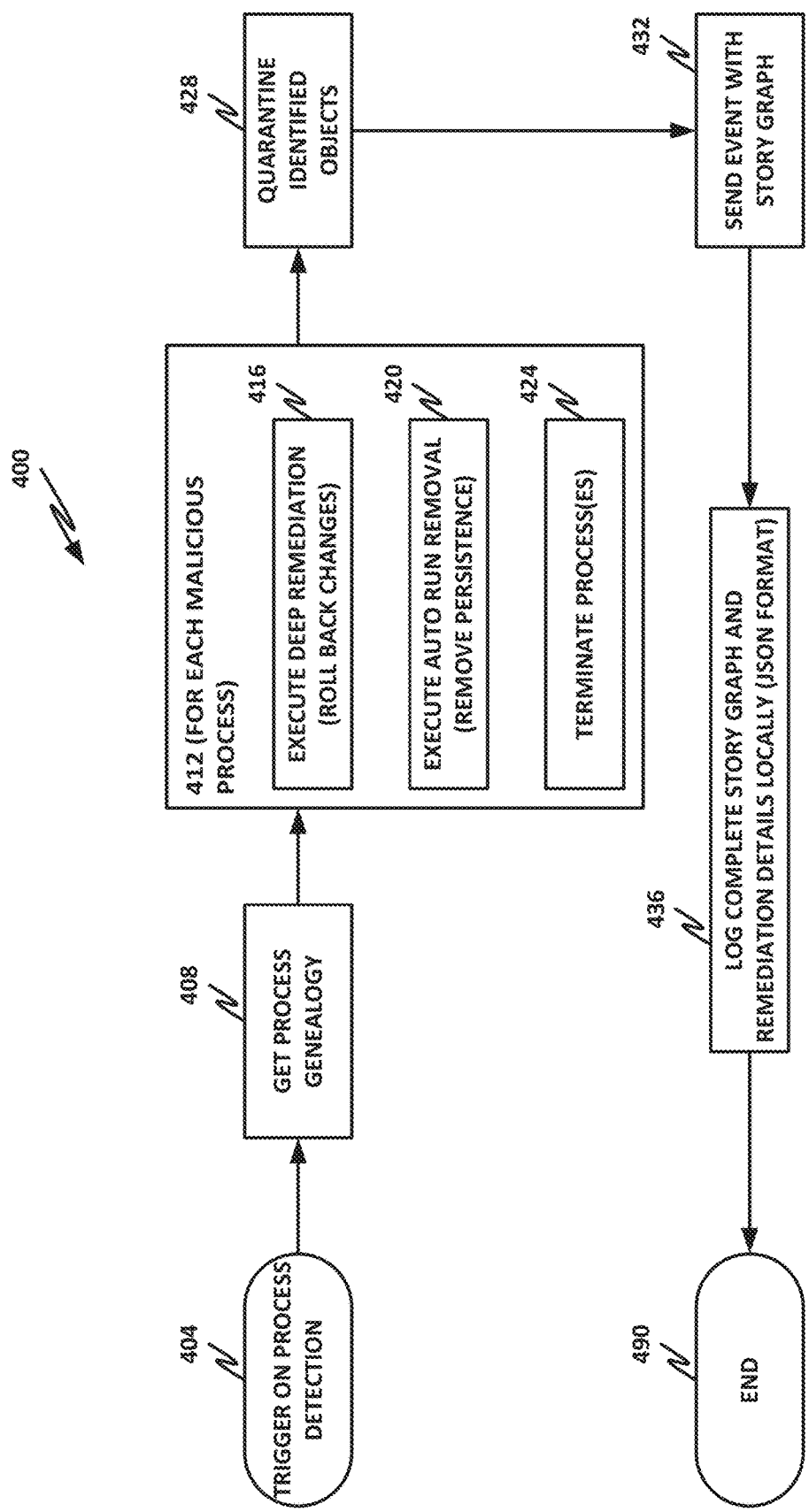
FIG. 4 is a workflow diagram illustrating a workflow for malware remediation.

FIG. 4 is a workflow diagram 400. This illustrates a workflow for performing malware remediation according to the teachings of the present specification. Workflow 400 may be performed, for example, by a security engine running on a client device.

An objective of workflow 400 is to facilitate behavioral analysis by allowing unknown malware to execute in a controlled way to increase the likelihood of detecting its characteristics. It also helps to protect and correct the endpoint from damage inflicted by the malware while its behavior is being analyzed. Furthermore, it permits new (innocent) software to run without undue delay or prevention by the security agent. This can be accomplished by tracking and recording changes made by the suspected malware to the file, directory, registry, and other locations. This enables the system to undo the effects and restore the endpoint to its original state if the suspected file is found to indeed be malware.

The security agent may also provide enhanced remediation to bring in superior remediation capabilities by utilizing various techniques. These include, by way of illustrative and nonlimiting example:

Deep Remediation—Monitors and backs up all the disk activities of a monitored process, so that it can roll back any changes to the original state when remediated.

Process Genealogies—Monitors process creation and termination events in the system, establishes relationships (direct parent-child and indirect parent-child) between processes when detected, and identifies critical processes and root processes in the process chain.

AutoRun removal—Looks up possible locations that malware may use to persist after a breach, including but not limited to the AutoRun registry entries, shortcuts, startup entries, Windows services, scheduled tasks, WMI triggers, and others.

Enhanced remediation can, in some cases, be provided in different modes. In full monitoring mode, the security agent uses local disk space to store the modifications done by the unknown process until detection (time boxed). It then rolls back all changes (e.g., files, registry entries, services, scheduled tasks) made by the monitored process and releases disk space.

An alternative operational mode is partial monitoring mode, which in some cases may be used to monitor newly created files only. In some embodiments, this is the default mode. In partial monitoring mode, the security agent tracks only newly created files by the malware, and thus is not able to roll back all changes. This mode is useful in cases where disk space is at a premium, or is a concern.

Enhanced remediation workflow 400 triggers in block 404 on process detection. In other words, the system may detect a new process, either because it has newly spawned, or because it first appears after being downloaded, copied from a network location or a removable disk, or by some other action.

In block 408, the security agent gets the process genealogy. Getting the process genealogy may include examining and/or truncating a process tree, which may have been built as the process was executing.

Once the process tree and the full process genealogy have been revealed, then meta-block 412 includes a number of operations that, in some embodiments, are performed for each process in the process genealogy. These can include, in block 416, executing a deep remediation, which rolls back changes. In block 420, the system may also execute an AutoRun removal process which removes persistence. In block 424, the system may terminate the process or processes, including processes that have horizontal and/or vertical relationships to the malicious process, up to a root process that is not terminated. Identification of a root process is discussed more particularly in connection with FIG. 3.

In block 428, the security agent quarantines all identified objects. In block 432, the security agent may send an event with a story graph to a policy engine of an enterprise or global security server. This policy engine can then watch for similar malware on other systems within the enterprise or globally.

In block 436, the security agent logs a complete story graph and remediation details locally. In one example, the story graph and remediation details are provided in a JavaScript Object Notation (JSON) format.

In block 490, the workflow ends.

One consideration for workflow 400 is when to trigger process detection in block 404. Triggering for monitoring may occur on various different events. For example, if a process is identified as having a reputation less than or equal to a threshold (e.g., an unknown or negative reputation) then enhanced remediation may be triggered. In security services provided by MCAFEE, LLC, a reputation of 50 is "unknown," and other reputation services may use other reputation scales.

Monitoring may also be triggered when a process reputation changes and drops below the threshold, for example, due to dynamic link library (DLL) orchestration or injection. Enhanced remediation could also be triggered when a reputation override from an enterprise security server forces the reputation to a value less than or equal to the threshold.

In some cases, events may also be used to trigger a cessation of monitoring of the process. For example, in some embodiments the system may stop monitoring after 10 minutes if there are no detections of malicious activity.

In some embodiments, workflow 400 may include a concept of sessions. Sessions may include monitored processes and all spawned processes from the monitored process. Sessions can include active sessions, terminated sessions, and archived sessions. If there are no detections, then unmonitored sessions may be moved to terminated sessions for disk cleanup and archiving.

In some embodiments, special storage regions may be allocated on a drive and be protected to store session information. Terminated sessions may be purged at regular intervals (e.g., 10 minutes) to keep usage within a threshold, such as within 5 percent of overall disk space of the drive.

Figure 5:
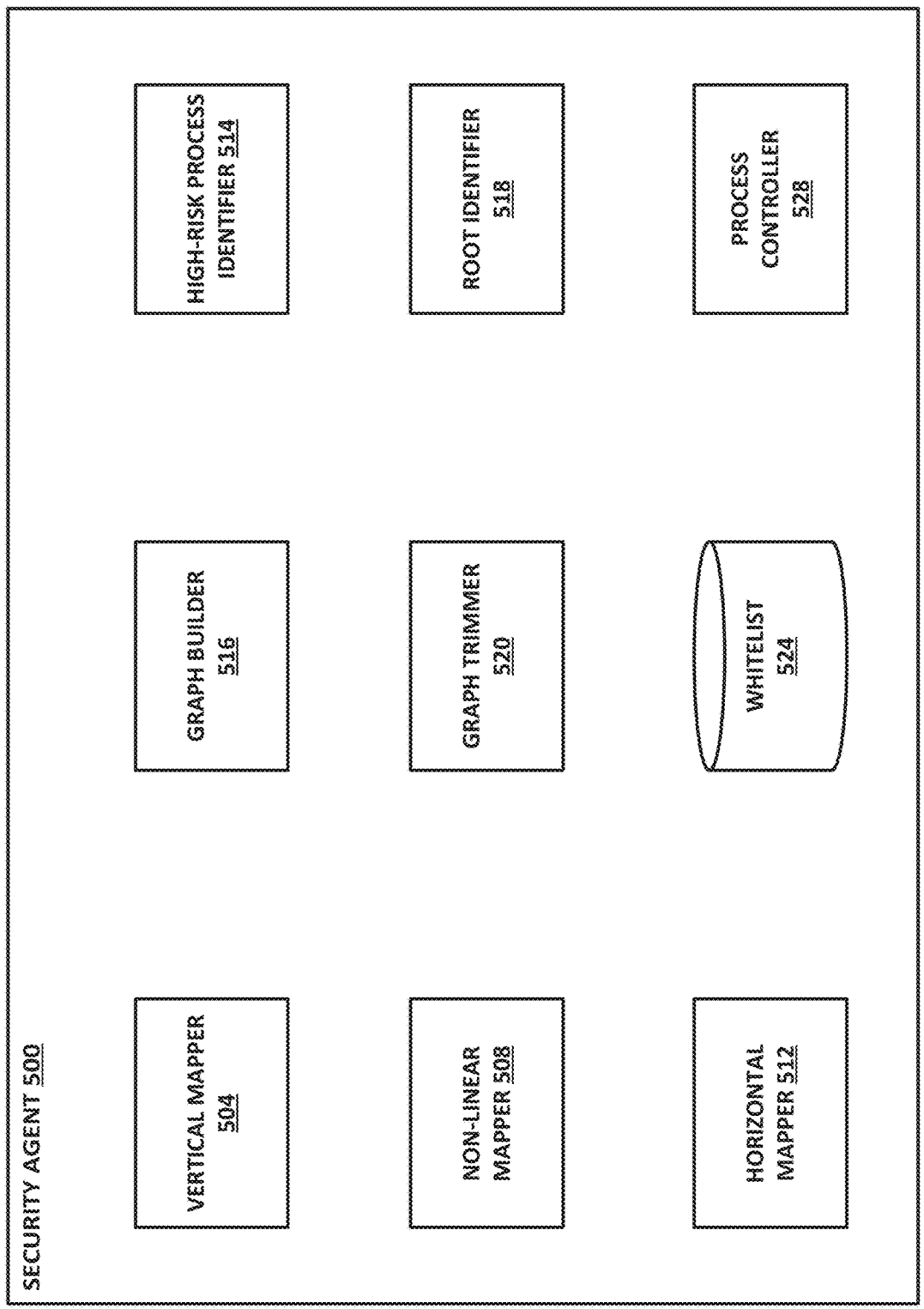
FIG. 5 is a block diagram of selected elements of a security agent.

FIG. 5 is a block diagram of selected elements of a security agent 500. There is disclosed herein a security agent 500 with a number of modules, wherein each module may be a discrete element. However, this should not be understood as a limiting example. For example, the modules may be hardware modules, software modules, firmware modules, or any combination thereof. Furthermore, while the various operations are disclosed herein as discrete modules, it should be understood that a particular function or method could span one or more modules, while in other cases a single module could perform more than one function. Thus, the block diagram of security agent 500 should be understood to be essentially functional in nature, and to illustrate the various functions that may be performed by security agent 500, rather than requiring any specific hardware, software, and/or security or firmware configuration.

Security agent 500 includes a vertical mapper 504. Vertical mapper 504 includes logic to map vertical or direct parent-child relationships between processes. In some cases, this is a nearly trivial task, and may even be provided by the operating system, which provides its own mappings of direct process genealogy. Thus, in at least one embodiment, a vertical mapper may be configured simply to query the operating system for the vertical mappings.

Security agent 500 also includes a nonlinear mapper 508, which may be configured to map or trace nonlinear relationships. This is illustrated, for example, in FIG. 3 wherein PowerShell 320 manipulates a database or list for task scheduler service 340, to cause task scheduler service 340 to launch a process.

Nonlinear mappings may be used to derive horizontal mappings within horizontal mapper 512. Horizontal mapper 512 may include logic to infer horizontal or indirect parent-child relationships, such as the relationship between PowerShell 320 and PowerShell 344 in FIG. 3. This kind of horizontal relationship indicates that one object is an indirect child of an object, or in other words, that the second object was caused to be spawned by the first object, even though the first object is not the direct parent of the second object.

A graph builder 516 may be used to construct a process graph similar to process graph 200 of FIG. 2 and process graph 300 of FIG. 3.

As part of graph builder 516, there may be a root identifier 518, which is configured to identify a root process above which remediation is not necessary. For example, in FIG. 3, email_client.exe 312 is identified as the root process. Email_client.exe 312 is not, itself, compromised, and is not malicious, but rather is a victim of malicious activity by runme.exe 316. Generally, as remediation occurs, when the graph is traversed vertically, processes including and above the root process are not terminated or remedied.

A graph trimmer 520 may also be provided to trim the graph, such as by removing information that is deemed not useful in a security context. For example, in FIG. 3, explorer.exe 304 is identified as a parent to a number of processes. But because explorer.exe 304 is a nearly ubiquitous parent to user launched processes, it is not interesting from a security perspective that explorer.exe appears as a parent to multiple processes.

Security agent 500 may also include a whitelist 524. Whitelist 524 may include a list of known processes, such as operating system processes, that are deemed trustworthy and should not be designated as malicious. Whitelisted processes generally should appear at or above the root process in a process graph.

A process controller 528 may have low-level access to the system, or to system services. This allows process controller 528 to insert hooks into other processes, or to perform other low-level operations, such as disk access, as well as access to events, triggers, schedules, databases, and other resources that enable process controller 528 to take action over other processes. This makes process controller 528 suitable for performing the remedial operations of security agent 500. Depending on the operating mode, the remedial actions may be full or partial, but in either case may involve rolling back some or all of the work done by the identified malware process. Furthermore, process controller 528 enables security agent 500 to perform some of the graphing functions of graph builder 516, and in particular some of the horizontal and nonlinear mapping functions.

A high-risk process identifier 514 may include logic for identifying high-risk processes. Some techniques for identifying high-risk processes, including triggering identification, are discussed in connection with FIG. 4, above, and elsewhere throughout this specification. In some embodiments, high-risk process identifier 514 may use conventional malware logic to identify high-risk processes, or may interface with a customary antivirus or anti-malware engine to identify suspicious processes. Processes that are identified as suspicious may be subjected to enhanced security screening.

Figure 6:
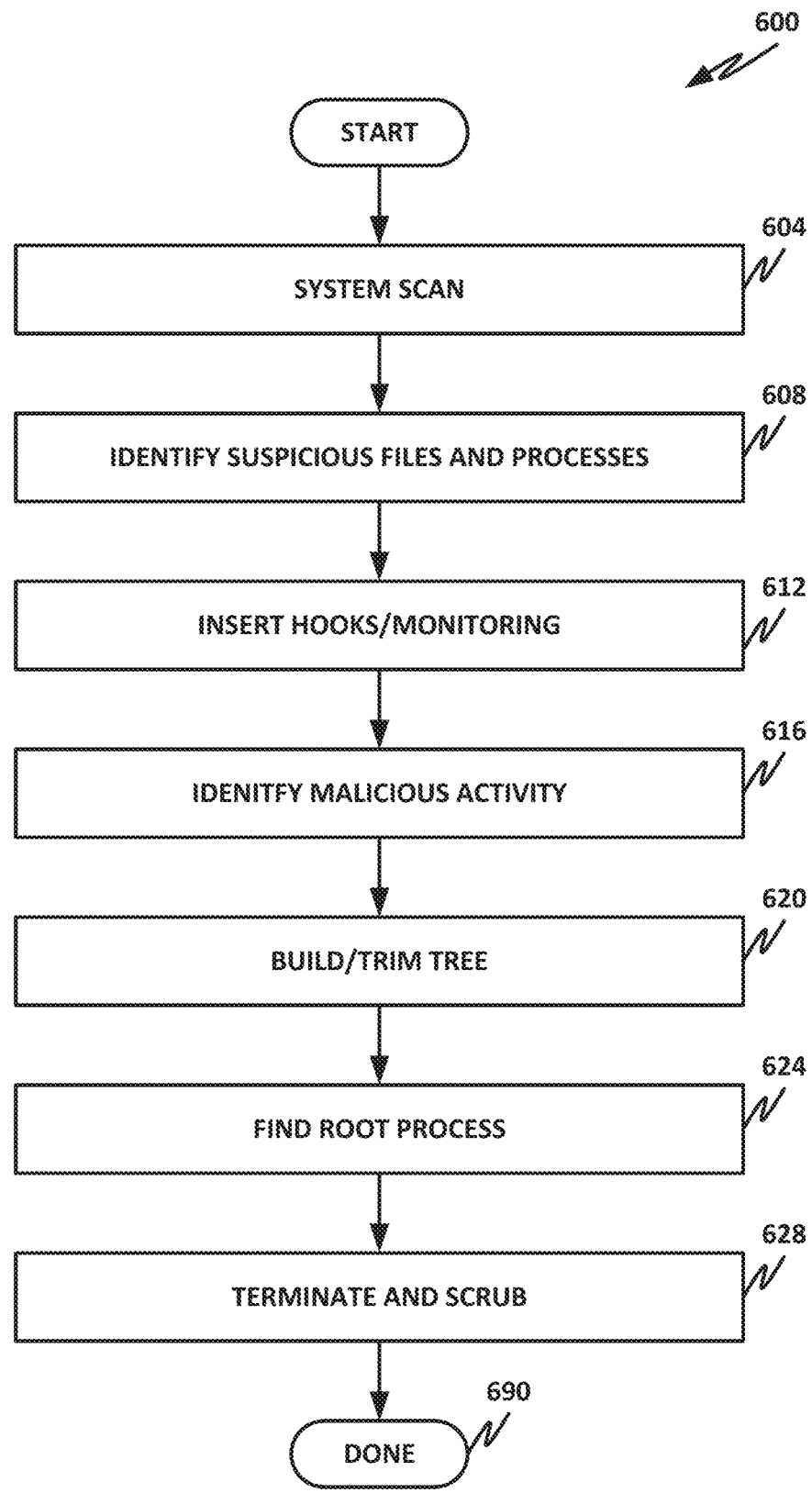
FIG. 6 is a flowchart of a method that may be performed in whole or in part by a security agent.

FIG. 6 is a flowchart of a method 600. Method 600 may be performed in whole or in part by a security agent as described in the present specification. Method 600 is illustrated as a flow of sequential elements from element 604 to element 690. This illustration of these elements is not intended to imply that the operations must be performed in this particular sequence, nor is it intended to necessarily imply a specific cause-and-effect relationship between certain elements.

Starting in block 604, the security agent initializes a security scan. This security scan could be triggered on system startup, on another event, scheduled periodically, or otherwise performed at a given time. In other embodiments, a full system scan is not required, but scanning of a particular object or group of objects may be triggered on some other event. For example, when a file is newly added or opened on the operating system, this may trigger scanning of that particular file.

In block 608, the security agent may identify from the scan one or more objects (including processes and/or files), that are deemed suspicious. For example, these may be objects that do not have a known reputation, or that have a known reputation but meet a particular threshold, such as in the example where a threshold is less than or equal to 50.

In block 612, for each of these suspicious processes, the security agent inserts hooks, or subjects the processes to other monitoring. The hooks may be used to help a mapping module to build a process tree or process graph of the relationships between the original process and other processes on the operating system. This can include hooks that enable the building of nonlinear and horizontal (indirect) parent-child relationships.

In block 616, the security agent identifies malicious activity within one or more monitored processes. As discussed in connection with high-risk process identifier 514 of FIG. 5, identification of malicious activity may in some embodiments be based on existing or known malware identification techniques. In particular, this can include behavioral or heuristic analysis that identifies malicious or suspicious behavior.

In block 620 the security agent builds, or loads, the process tree or process graph. Note that in some embodiments, building the process graph is a continuous process that occurs as the process is executing. In other embodiments, the graph is built as-needed, at the time of analysis. In block 620, the security agent may also trim the process graph as necessary. For example, referring to FIG. 3, in process graph 300 the security agent may trim explorer.exe 304 from the tree, because the fact that a process is a child of explorer.exe 304 may not be interesting in the present context as a security indicator. Furthermore, there are branches starting from notepad.exe 308 (which have no children) and browser.exe 324 (which has no malicious child activity) that can also be trimmed from the tree, because they do not appear to provide any counting can also become because they do not appear to provide any additional security context to the tree.

In block 624, the security agent traverses the process tree both horizontally and vertically, looking for malicious activity. Any direct, vertical descendants of the identified malicious process may be automatically terminated, as may any immediate horizontal relationships, and any of their vertical descendants. However, identifying vertical ancestors for termination may be a nontrivial process. For example, if malicious activity is detected in PowerShell 320 of process graph 300 of FIG. 3, then a decision needs to be made where to terminate upward, vertically. In this case, a root identifier identifies email_client.exe 312 as the known good root process, and establishes a security boundary between email_client.exe 312 and runme.exe 316. Below the established security boundary, processes may be marked both vertically and horizontally for termination, while above the security boundary, the root process and any of its parent processes are not marked for termination.

In block 628, the security agent carries out the terminations, and performs other scrubbing or remedial action that may be needed to roll back the effects of the malicious process. As discussed above, this may include a full or a partial roll back, depending on the operating mode.

In block 690, the method is done.

Figure 7:
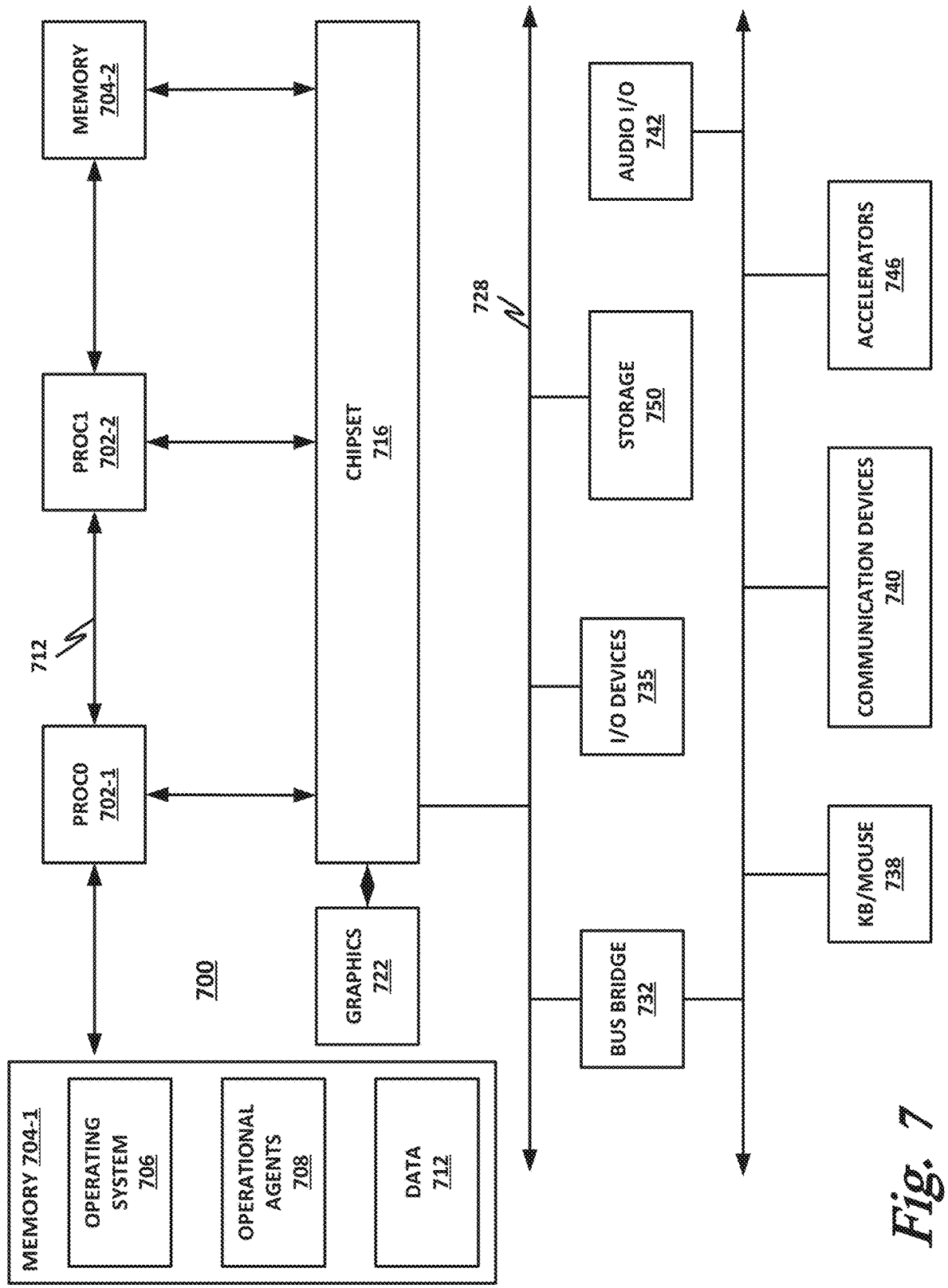
FIG. 7 is a block diagram of selected elements of a hardware platform.

FIG. 7 is a block diagram of a hardware platform 700. Hardware platform 700 may be configured or adapted to provide multi-lateral process trees for malware remediation, according to embodiments of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 700, even though they may be scattered across a data center, or even located in different data centers.

Hardware platform 700 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, Internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 700 is arranged in a point-to-point (PtP) configuration. This PtP configuration is popular for personal computer (PC) and server-type devices, although it is not so limited, and any other bus type may be used.

Hardware platform 700 is an example of a platform that may be used to implement embodiments of the teachings of this specification. For example, instructions could be stored in storage 750. Instructions could also be transmitted to the hardware platform in an ethereal form, such as via network interface 748, or retrieved from another source via any suitable interconnect. Once received (from any source), the instructions may be loaded into memory 704, and may then be executed by one or more processor 702 to provide elements such as an operating system 706, operational agents 708, or data 712.

Figure 9:
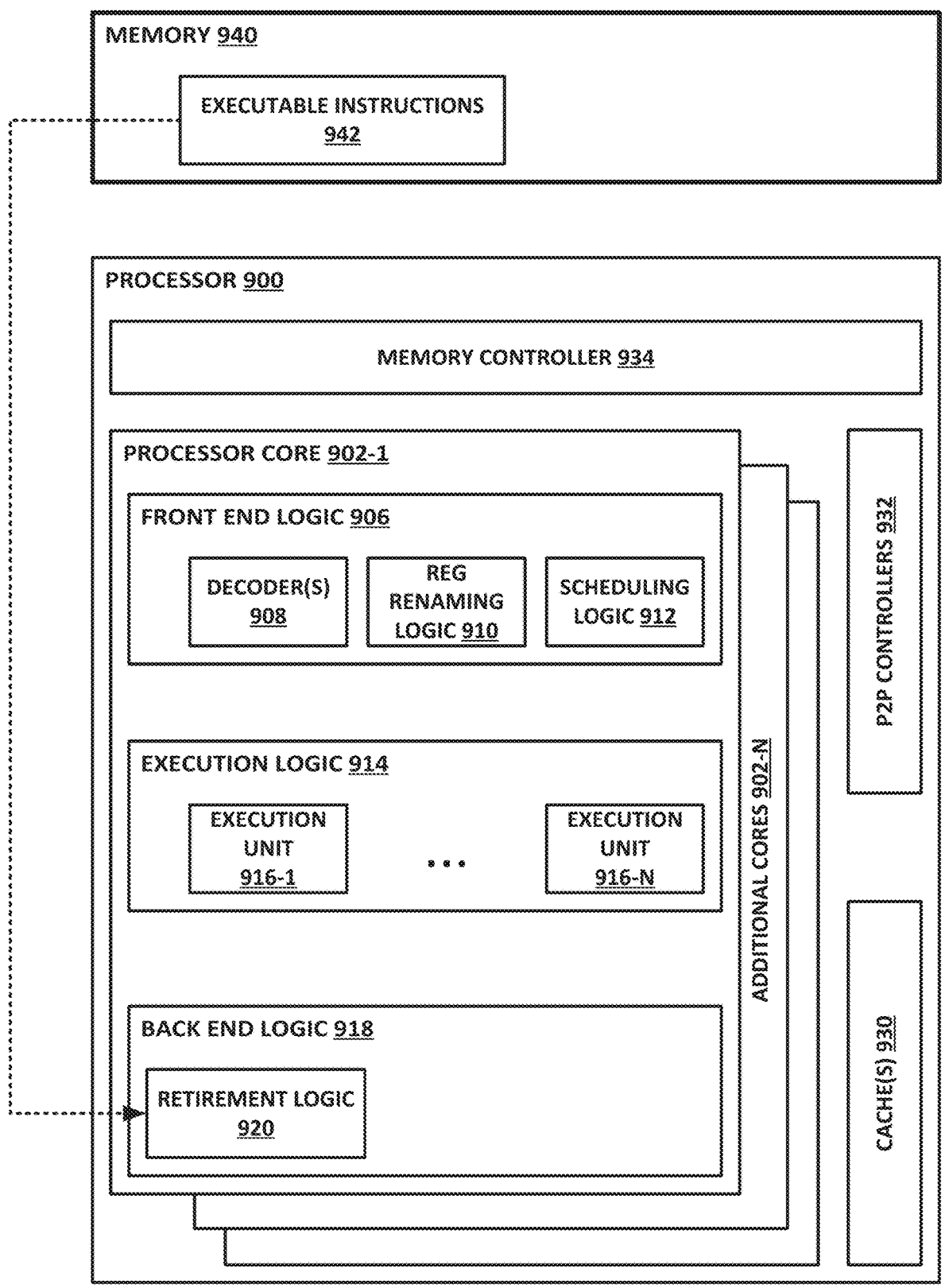
FIG. 9 is a block diagram of selected elements of a processor.

Hardware platform 700 may include several processors 702. For simplicity and clarity, only processors PROC0 702-1 and PROC1 702-2 are shown. Additional processors (such as 2, 4, 8, 16, 24, 32, 64, or 128 processors) may be provided as necessary, while in other embodiments, only one processor may be provided. Details of processors 702 are not illustrated in this FIGURE, but one embodiment is illustrated in FIG. 9. Processors may have any number of cores, such as 1, 2, 4, 8, 16, 24, 32, 64, or 128 cores.

Processors 702 may be any type of processor and may communicatively couple to chipset 716 via, for example, PtP interfaces. Chipset 716 may also exchange data with other elements, such as a high-performance graphics adapter 722. In alternative embodiments, any or all of the PtP links illustrated in FIG. 7 could be implemented as any type of bus, or other configuration rather than a PtP link. In various embodiments, chipset 716 may reside on the same die or package as a CPU, or on one or more different dies or packages. Each chipset may support any suitable number of CPUs 702. A chipset 716 (which may be a chipset, uncore, Northbridge, Southbridge, or other suitable logic and circuitry) may also include one or more controllers to couple other components to one or more CPUs.

Two memories, 704-1 and 704-2 are shown, connected to PROC0 702-1 and PROC1 702-2, respectively. As an example, each processor is shown connected to its memory in a direct memory access (DMA) configuration, though other memory architectures are possible, including ones in which memory 704 communicates with processor 710 via a bus. For example, some memories may be connected via a system bus, or in a data center, memory may be accessible in a remote DMA (RDMA) configuration.

Memory 704 may include any form of volatile or nonvolatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 704 may be used for short, medium, and/or long-term storage. Memory 704 may store any suitable data or information utilized by platform logic. In some embodiments, memory 704 may also comprise storage for instructions that may be executed by the cores of CPUs 702 or other processing elements (e.g., logic resident on chipsets 716) to provide functionality.

In certain embodiments, memory 704 may comprise a relatively low-latency volatile main memory, while storage 750 may comprise a relatively higher-latency nonvolatile memory. However, memory 704 and storage 750 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 704 and storage 750, for example, in a single physical memory device, and in other cases, memory 704 and/or storage 750 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 722 may be configured to provide a human-readable visual output, such as a command-line interface (CLI) or graphical desktop such as Microsoft™ Windows, Apple OSX™ desktop, or a Unix/Linux X Window System-based desktop. Graphics adapter 722 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example.

In some examples, graphics adapter 722 may include a hardware graphics card, which may have its own memory and its own graphics processing unit (GPU).

Chipset 716 may be in communication with a bus 728 via an interface circuit. Bus 728 may have one or more devices that communicate over it, such as a bus bridge 732, I/O devices 735, network interface 748, accelerators 746, communication devices 740, and a keyboard and/or mouse 738, by way of nonlimiting example. In general terms, the elements of hardware platform 700 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 740 can broadly include any communication not covered by network interface 748 and the various I/O devices described herein. This may include, for example, various USB, FireWire, Lightning, or other serial or parallel devices that provide communications.

I/O Devices 735 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, audio I/O 742 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 732 may be in communication with other devices such as a keyboard/mouse 738 (or other input devices such as a touch screen, trackball, etc.), communication devices 740 (such as modems, network interface devices, peripheral interfaces such as PCI or PCIe, or other types of communication devices that may communicate through a network), audio I/O devices 742, a data storage device 744, and/or accelerators 746. In alternative embodiments, any portions of the bus architectures could be implemented with one or more PtP links.

Operating system 706 may be, for example, Microsoft™ Windows, Linux, UNIX, Mac OS X, iOS, MS-DOS, or an embedded or real-time operating system (including embedded or real-time flavors of the foregoing). In some embodiments, a hardware platform 700 may function as a host platform for one or more guest systems that invoke application (e.g., operational agents 708).

Operational agents 708 may include one or more computing engines that may include one or more nontransitory computer-readable mediums having stored thereon executable instructions operable to instruct a processor to provide operational functions. At an appropriate time, such as upon booting hardware platform 700 or upon a command from operating system 706 or a user or security administrator, processor 702 may retrieve a copy of the operational agent (or software portions thereof) from storage 750 and load it into memory 704. Processor 710 may then iteratively execute the instructions of operational agents 708 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 748 may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an Internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 748 may include one or more physical ports that may couple to a cable (e.g., an Ethernet cable, other cable, or waveguide).

In some cases, some or all of the components of hardware platform 700 may be virtualized, in particular the processor(s) and memory. For example, a virtualized environment may run on OS 706, or OS 706 could be replaced with a hypervisor or virtual machine manager. In this configuration, a virtual machine running on hardware platform 700 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 8. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

Figure 8:
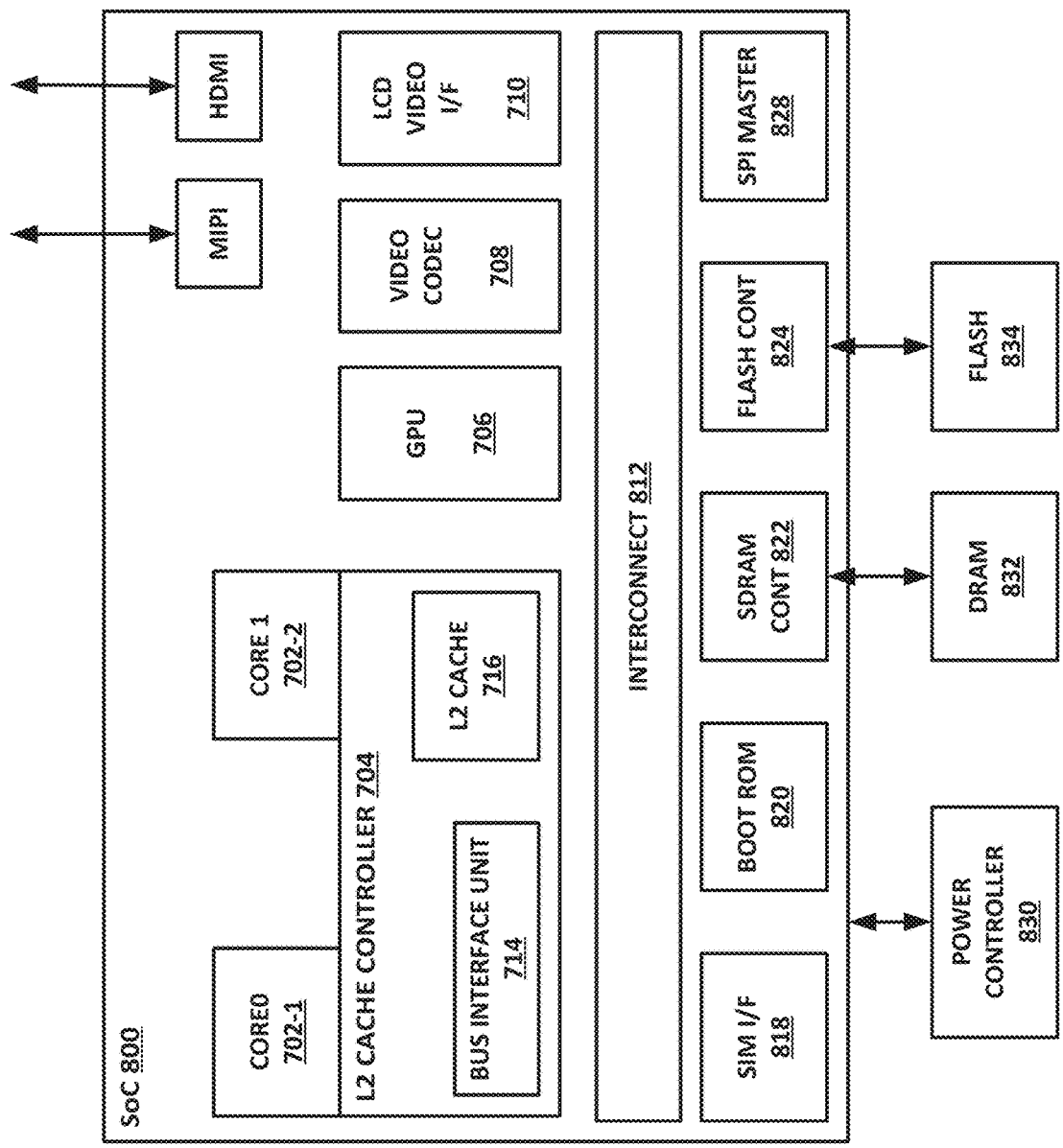
FIG. 8 is a block diagram of selected elements of a system-on-a-chip (SoC).

FIG. 8 is a block illustrating selected elements of an example SoC 800. SoC 800 may be configured or adapted to provide multi-lateral process trees for malware remediation, according to embodiments of the present specification.

At least some of the teachings of the present specification may be embodied on an SoC 800, or may be paired with an SoC 800. SoC 800 may include, or may be paired with, an advanced reduced instruction set computer machine (ARM) component. For example, SoC 800 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft™ Surface. SoC 800 could also be integrated into, for example, a personal computer, server, video processing components, laptop computer, notebook computer, netbook, or touch-enabled device.

As with hardware platform 700 above, SoC 800 may include multiple cores 802*a* and 802*b*. In this illustrative example, SoC 800 also includes an L2 cache control 804, a graphics processing unit (GPU) 806, a video codec 808, a liquid crystal display (LCD) I/F 810 and an interconnect 812. L2 cache control 804 can include a bus interface unit 814, a L2 cache 816. Liquid crystal display (LCD) I/F 810 may be associated with mobile industry processor interface (MIPI)/high-definition multimedia interface (HDMI) links that couple to an LCD.

SoC 800 may also include a subscriber identity module (SIM) I/F 818, a boot read-only memory (ROM) 820, a synchronous dynamic random-access memory (SDRAM) controller 822, a flash controller 824, a serial peripheral interface (SPI) master 828, a suitable power control 830, a dynamic RAM (DRAM) 832, and flash 834. In addition, one or more embodiments include one or more communication capabilities, interfaces, and features such as instances of Bluetooth™ 836, a 3G modem 838, a global positioning system (GPS) 840, and an 802.11 Wi-Fi 842.

Designers of integrated circuits such as SoC 800 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a graphics processing unit (GPU) engine, a security controller, and many other IP blocks. In many cases, each of these IP blocks has its own embedded microcontroller.

FIG. 9 is a block diagram illustrating selected elements of a processor 900. Processor 900 may be configured or adapted to provide multi-lateral process trees for malware remediation, according to embodiments of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, central processor unit (CPU), advanced RISC (reduced instruction-set computing) machine (ARM), digital signal processor (DSP), field-programmable gate array (FPGA), graphics processing unit, programmable logic array, application-specific integrated circuit (ASIC), or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 900 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 900 includes one or more processor cores 902, including core 902-1-902-N. Cores 902 may be, as appropriate, single-thread cores or multi-thread cores. In multi-threaded cores, more than one hardware thread may be provided at a time, and the core may therefore provide more than one logical core per physical core. The cores may be configured to execute instruction code. Each processor 900 may include at least one shared cache 930, which may be treated logically as part of memory 940. Caches 930 may be filled according to known caching techniques, and may store instructions and/or data that may be used by one or more components of processor 900.

Processor 900 may include an integrated memory controller (MC) 934, to communicate with memory 940. Memory controller 934 may include logic and circuitry to interface with memory 940, and may also include a cache controller to handle filling and evicting instructions and data to and from cache 930.

By way of example, each core 902 may include front-end logic 906, execution logic 914, and back-end logic 918.

In the illustrated embodiment, front-end logic 906 includes an instruction decoder or decoders 908, register renaming logic 910, and scheduling logic 912. Decoder 908 may decode instructions received. Register renaming logic 910 may provide register renaming, for example to facilitate pipelining. Scheduling logic 912 may schedule instruction execution, and may provide out-of-order (OOO) execution. Front-end logic 906 may fetch incoming instructions, perform various processing (e.g., caching, decoding, branch predicting, etc.), and pass instructions to execution logic 914.

Execution logic 914 includes one or more execution units 916-1-916-N. Execution units 916 may include hardware instructions and microcode to carry out the provided instructions.

Backend logic 918 includes retirement logic 920. Core 902 may provide for speculative execution of instructions, branch prediction, and similar. Retirement logic 920 may be configured to determine which predicted instructions were actually needed by the program flow.

Processor 900 may also include a PtP controller 932, which enables connection to an uncore, chipset, Northbridge, Southbridge, or bus, by way of example.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

Example 1 includes a computing apparatus, comprising: a processor and a memory; and instructions encoded within the memory to instruct the processor to provide a security agent to: identify a malicious process; construct a genealogical process tree of the malicious process, the genealogical process tree including both vertical direct inheritance and horizontal indirect inheritance relationships; and terminate the malicious process and at least some related processes in the genealogical process tree.

Example 2 includes the computing apparatus of example 1, wherein the security agent is to identify horizontal relationships by identifying non-linear relationships, in which a first process indirectly causes a second process to be spawned by a third process.

Example 3 includes the computing apparatus of example 1, wherein terminating at least some related processes comprises terminating all processes that are vertical and horizontal descendants of the malicious process.

Example 4 includes the computing apparatus of example 1, wherein terminating at least some related processes comprises terminating at least one vertical parent of the malicious process.

Example 5 includes the computing apparatus of example 1, wherein the security agent is further to identify and roll back changes made by the malicious process or by a related process.

Example 6 includes the computing apparatus of example 5, wherein rolling back changes comprises identifying sources of persistency for the malware and eliminating the sources of persistency.

Example 7 includes the computing apparatus of example 6, wherein eliminating sources of persistency comprises eliminating autorun or scheduled task entries.

Example 8 includes the computing apparatus of example 1, wherein the security agent is further to report the malware to a security server, including providing a story graph.

Example 9 includes the computing apparatus of example 1, wherein the security agent is further to locally log the malware, including logging a story graph and remediation details.

Example 10 includes the computing apparatus of example 1, wherein the security agent is further to trigger an analysis of one or more newly-identified files.

Example 11 includes the computing apparatus of example 10, wherein the security agent is further to identify at least one file or process as suspicious, and to initiate further analysis of the suspicious file or process.

Example 12 includes the computing apparatus of example 11, wherein the security agent is further to insert operating system hooks into the suspicious file or process to assist in constructing the genealogical process tree.

Example 13 includes the computing apparatus of example 11, wherein the security agent is further to initiate detailed monitoring of the suspicious file or process to assist in constructing the genealogical process tree.

Example 14 includes the computing apparatus of any of examples 12-13, wherein the security agent is further to cease further analysis after a timeout.

Example 15 includes the computing apparatus of example 14, wherein the timeout is approximately ten minutes.

Example 16 includes the computing apparatus of example 1, wherein the security agent is further to trim from the genealogical process tree processes with minimal security implications, and branches lacking malicious activity.

Example 17 includes the computing apparatus of example 1, wherein the security agent is further to trim whitelisted processes from the genealogical process tree.

Example 18 includes the computing apparatus of example 1, wherein the security agent is further to provide a full monitoring mode, the full monitoring mode to store sufficient data to fully roll back changes made by the malicious process.

Example 19 includes the computing apparatus of example 1, wherein the security agent is further to provide a partial monitoring mode, the partial monitoring mode to track newly created files by the malicious process.

Example 20 includes the computing apparatus of any of examples 1-19, wherein the security agent is further configured to select a root process trusted to not be malicious.

Example 21 includes the computing apparatus of example 20, wherein the security agent is to not terminate processes vertically at or above the root process.

Example 22 includes one or more tangible, non-transitory computer-readable storage media having stored thereon executable instructions to provide a security agent configured to: determine that a running process is malicious; construct a process graph of the malicious process, the process graph comprising direct parent-child relationships of directly-spawned processes, indirect parent-child relationships, and non-linear relationships wherein a first process causes a second process to be spawned indirectly, creating an indirect parent-child relationship; and terminate the malicious process, direct children of the malicious process, and indirect children of the malicious process.

Example 23 includes the one or more tangible, non-transitory computer-readable media of example 22, wherein the security agent is further to terminate at least one direct parent of the malicious process.

Example 24 includes the one or more tangible, non-transitory computer-readable media of example 22, wherein the security agent is further to identify and roll back changes made by the malicious process or by a related process.

Example 25 includes the one or more tangible, non-transitory computer-readable media of example 24, wherein rolling back changes comprises identifying sources of persistency for the malware and eliminating the sources of persistency.

Example 26 includes the one or more tangible, non-transitory computer-readable media of example 25, wherein eliminating sources of persistency comprises eliminating autorun or scheduled task entries.

Example 27 includes the one or more tangible, non-transitory computer-readable media of example 22, wherein the security agent is further to report the malware to a security server, including providing a story graph.

Example 28 includes the one or more tangible, non-transitory computer-readable media of example 22, wherein the security agent is further to locally log the malware, including logging a story graph and remediation details.

Example 29 includes the one or more tangible, non-transitory computer-readable media of example 22, wherein the security agent is further to trigger an analysis of one or more newly-identified files.

Example 30 includes the one or more tangible, non-transitory computer-readable media of example 29, wherein the security agent is further to identify at least one file or process as suspicious, and to initiate further analysis of the suspicious file or process.

Example 31 includes the one or more tangible, non-transitory computer-readable media of example 30, wherein the security agent is further to insert operating system hooks into the suspicious file or process to assist in constructing the genealogical process tree.

Example 32 includes the one or more tangible, non-transitory computer-readable media of example 30, wherein the security agent is further to initiate detailed monitoring of the suspicious file or process to assist in constructing the genealogical process tree.

Example 33 includes the one or more tangible, non-transitory computer-readable media of any of examples 31-32, wherein the security agent is further to cease further analysis after a timeout.

Example 34 includes the one or more tangible, non-transitory computer-readable media of example 33, wherein the timeout is approximately ten minutes.

Example 35 includes the one or more tangible, non-transitory computer-readable media of example 22, wherein the security agent is further to trim from the genealogical process tree processes with minimal security implications, and branches lacking malicious activity.

Example 36 includes the one or more tangible, non-transitory computer-readable media of example 22, wherein the security agent is further to trim whitelisted processes from the genealogical process tree.

Example 37 includes the one or more tangible, non-transitory computer-readable media of example 22, wherein the security agent is further to provide a full monitoring mode, the full monitoring mode to store sufficient data to fully roll back changes made by the malicious process.

Example 38 includes the one or more tangible, non-transitory computer-readable media of example 22, wherein the security agent is further to provide a partial monitoring mode, the partial monitoring mode to track newly created files by the malicious process.

Example 39 includes the one or more tangible, non-transitory computer-readable media of any of examples 22-38, wherein the security agent is further configured to select a root process trusted to not be malicious.

Example 40 includes the one or more tangible, non-transitory computer-readable media of example 39, wherein the security agent is to not terminate processes directly at or above the root process.

Example 41 includes a computer-implemented method of remedying activity by a malicious process, comprising: determining observationally and/or heuristically that the malicious process is malware; constructing a process tree for the malicious process, the process tree comprising both direct vertical parent-child relationships and indirect horizontal parent-child relationships, the horizontal relationships representing a relationship wherein a first process causes a second process to be spawned without spawning the second process directly; and terminating the malicious process, vertical children of the malicious process, and horizontal children of the malicious process.

Example 42 includes the method of example 41, further comprising identifying horizontal relationships by identifying non-linear relationships, in which a first process indirectly causes a second process to be spawned by a third process.

Example 43 includes the method of example 41, further comprising terminating at least one vertical parent of the malicious process.

Example 44 includes the method of example 41, further comprising identifying and rolling back changes made by the malicious process or by a related process.

Example 45 includes the method of example 44, wherein rolling back changes comprises identifying sources of persistency for the malware and eliminating the sources of persistency.

Example 46 includes the method of example 45, wherein eliminating sources of persistency comprises eliminating autorun or scheduled task entries.

Example 47 includes the method of example 41, further comprising reporting the malware to a security server, including providing a story graph.

Example 48 includes the method of example 41, further comprising locally logging the malware, including logging a story graph and remediation details.

Example 49 includes the method of example 41, further comprising triggering an analysis of one or more newly-identified files.

Example 50 includes the method of example 41, further comprising identifying at least one file or process as suspicious, and to initiate further analysis of the suspicious file or process.

Example 51 includes the method of example 50, further comprising inserting operating system hooks into the suspicious file or process to assist in constructing the genealogical process tree.

Example 52 includes the method of example 50, further comprising identifying detailed monitoring of the suspicious file or process to assist in constructing the genealogical process tree.

Example 53 includes the method of any of examples 51-52, further comprising ceasing further analysis after a timeout.

Example 54 includes the method of example 53, wherein the timeout is approximately ten minutes.

Example 55 includes the method of example 41, further comprising trimming from the genealogical process tree processes with minimal security implications, and branches lacking malicious activity.

Example 56 includes the method of example 41, further comprising trimming whitelisted processes from the genealogical process tree.

Example 57 includes the method of example 41, further comprising providing a full monitoring mode, the full monitoring mode to store sufficient data to fully roll back changes made by the malicious process.

Example 58 includes the method of example 41, further comprising providing a partial monitoring mode, the partial monitoring mode to track newly created files by the malicious process.

Example 59 includes the method of any of examples 41-58, further comprising selecting a root process trusted to not be malicious.

Example 60 includes the method of example 59, further comprising protecting from termination processes vertically at or above the root process.

Example 61 includes an apparatus comprising means for performing the method of any of examples 41-60.

Example 62 includes the apparatus of example 61, wherein the means for performing the method comprise a processor and a memory.

Example 63 includes the apparatus of example 62, wherein the memory comprises machine-readable instructions, that when executed cause the apparatus to perform the method of any of examples 41-60.

Example 64 includes the apparatus of any of examples 61-63, wherein the apparatus is a computing system.

Example 65 includes at least one computer readable medium comprising instructions that, when executed, implement a method or realize an apparatus as illustrated in any of examples 41-64.

What is claimed is:

1. A computing apparatus, comprising:
 a processor and a memory; and
 instructions encoded within the memory to instruct the processor to provide a security agent to:
  identify a malicious process;
  construct a genealogical process tree of the malicious process, the genealogical process tree including both vertical direct inheritance and horizontal indirect inheritance relationships, wherein horizontal indirect inheritance relationships include a first object or process that was scheduled to run by a different object or process not a direct parent of the first object or process; and
  terminate the malicious process and at least some related processes in the genealogical process tree.

2. The computing apparatus of claim 1, wherein the security agent is to identify horizontal relationships by identifying non-linear relationships, in which a first process indirectly causes a second process to be spawned by a third process.

3. The computing apparatus of claim 1, wherein terminating at least some related processes comprises terminating all processes that are vertical and horizontal descendants of the malicious process.

4. The computing apparatus of claim 1, wherein terminating at least some related processes comprises terminating at least one vertical parent of the malicious process.

5. The computing apparatus of claim 1, wherein the security agent is further to identify and roll back changes made by the malicious process or by a related process.

6. The computing apparatus of claim 5, wherein rolling back changes comprises identifying sources of persistency for the malware and eliminating the sources of persistency.

7. The computing apparatus of claim 6, wherein eliminating sources of persistency comprises eliminating autorun or scheduled task entries.

8. The computing apparatus of claim 1, wherein the security agent is further to trigger an analysis of one or more newly-identified files.

9. The computing apparatus of claim 8, wherein the security agent is further to identify at least one file or process as suspicious, and to initiate further analysis of the suspicious file or process.

10. The computing apparatus of claim 9, wherein the security agent is further to insert operating system hooks into the suspicious file or process to assist in constructing the genealogical process tree.

11. The computing apparatus of claim 1, wherein the security agent is further to trim whitelisted processes from the genealogical process tree.

12. The computing apparatus of claim 1, wherein the security agent is further configured to select a root process trusted to not be malicious, and to not terminate processes vertically at or above the root process.

13. One or more tangible, non-transitory computer-readable storage media having stored thereon executable instructions to provide a security agent configured to:
 determine that a running process is malicious;
 construct a process graph of the malicious process, the process graph comprising direct parent-child relationships of directly-spawned processes, indirect parent-child relationships, and non-linear relationships wherein a first process scheduled a second process to be spawned indirectly, creating an indirect parent-child relationship wherein the first process is not a direct parent of the second process; and
 terminate the malicious process, direct children of the malicious process, and indirect children of the malicious process.

14. The one or more tangible, non-transitory computer-readable media of claim 13, wherein the security agent is further to terminate at least one direct parent of the malicious process.

15. The one or more tangible, non-transitory computer-readable media of claim 14, wherein the security agent is further to report the malware to a security server, including providing a story graph.

16. The one or more tangible, non-transitory computer-readable media of claim 13, wherein the security agent is further to trim from the genealogical process tree processes with minimal security implications, and branches lacking malicious activity.

17. The one or more tangible, non-transitory computer-readable media of claim 13, wherein the security agent is further to provide a full monitoring mode, the full monitoring mode to store sufficient data to fully roll back changes made by the malicious process.

18. The one or more tangible, non-transitory computer-readable media of claim 13, wherein the security agent is further to provide a partial monitoring mode, the partial monitoring mode to track newly created files by the malicious process.

19. A computer-implemented method of remedying activity by a malicious process, comprising:
   determining observationally and/or heuristically that the malicious process is malware;
   constructing a process tree for the malicious process, the process tree comprising both direct vertical parent-child relationships and indirect horizontal parent-child relationships, the horizontal relationships representing a relationship wherein a first process scheduled a second process to be spawned without spawning the second process as a direct parent; and
   terminating the malicious process, vertical children of the malicious process, and horizontal children of the malicious process.

20. The method of claim 19, further comprising identifying horizontal relationships by identifying non-linear relationships, in which a first process indirectly causes a second process to be spawned by a third process.

* * * * *